Feb. 16, 1954

R. W. KLING 2,669,338

POWER OPERATED CONVEYER-TYPE LOADING MACHINE

Filed May 23, 1952

INVENTOR.
Robert W. Kling
BY
H. Thrall Brewer
Atty.

Feb. 16, 1954 R. W. KLING 2,669,338
POWER OPERATED CONVEYER-TYPE LOADING MACHINE
Filed May 23, 1952 6 Sheets-Sheet 3

Fig. 4

INVENTOR.
Robert W. Kling
BY
Atty.

Feb. 16, 1954 R. W. KLING 2,669,338
POWER OPERATED CONVEYER-TYPE LOADING MACHINE
Filed May 23, 1952 6 Sheets-Sheet 4

INVENTOR.
Robert W. Kling
BY
Atty

Feb. 16, 1954

R. W. KLING

2,669,338

POWER OPERATED CONVEYER-TYPE LOADING MACHINE

Filed May 23, 1952

INVENTOR.
Robert W. Kling
BY
H. Sherrill Brewer
Att'y

Feb. 16, 1954 R. W. KLING 2,669,338
POWER OPERATED CONVEYER-TYPE LOADING MACHINE
Filed May 23, 1952 6 Sheets-Sheet 6

INVENTOR.
Robert W. Kling
BY
atty.

Patented Feb. 16, 1954

2,669,338

UNITED STATES PATENT OFFICE 2,669,338

POWER OPERATED CONVEYER-TYPE LOADING MACHINE

Robert W. Kling, Chicago, Ill., assignor to Athey Products Corporation, Chicago, Ill., a corporation of Illinois Application May 23, 1952, Serial No. 289,470

13 Claims. (Cl. 198—9)

This invention relates to power operated conveyor-type loading machines, and more particularly to such machines which have a feeding conveyor mechanism associated with the loading end of an elevating conveyor.

As a general object, my invention embodies the provision of a power operated loading machine having adjacent driven parts for moving material in angularly related or transverse directions and from one to the other of the parts toward a predetermined position, and in which machine provision is made for preventing large pieces of the material being moved from becoming jammed in or by the parts so as to cause damage thereto.

More specifically considered, the loading machine to which my invention relates embodies power driven parts for moving material inwardly from opposite ends of a backing plate of predetermined span and into the path of another power driven part which moves the material through a channel at the mid-portion of the backing plate, and wherein the backing plate, channel and the power driven parts are constructed and related so as to minimize the possibility of having larger pieces of material getting jammed in or between the parts and the backing plate or channel.

My invention has for another object the provision of a conveyor-type loading machine embodying a power operated feeding conveyor and adapted to the use of plates on opposite sides of the feeding conveyor which are reversible to vary their positions in respect to the feeding conveyor, thereby to effect improved efficiency of the loader operation and movement in loading materials from windrows, stock piles and the like.

Other objects and advantages of the invention will be apparent from the following description and the accompanying drawings, in which similar characters of reference indicate similar parts throughout the several views.

Referring to the six sheets of drawings.

Certain general aspects and structural details of the power operated conveyor-type loading machine disclosed herein are like those illustrated and described in the co-pending application of Raymore D. MacDonald, Serial No. 74,743, filed February 5, 1949, and now Patent No. 2,639,022, for Power Actuated Conveyor-Type Loader, and assigned to the same assignee.

Figure 1:
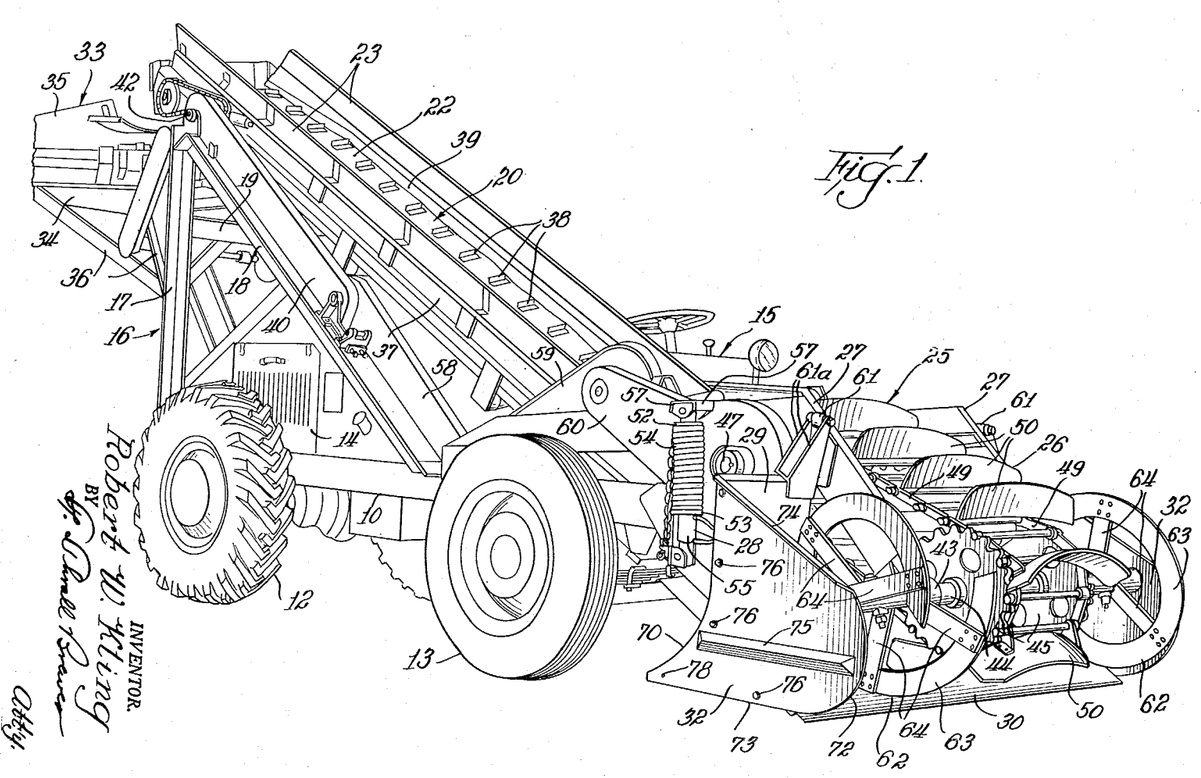
Fig. 1 is a general perspective view taken from in front and to one side of a power operated conveyor-type loading machine embodying a preferred form of my invention.

Having reference to the more general aspects of the structure of my loader which is shown in the accompanying drawings for illustrative purposes, that loader, as depicted in Fig. 1, is a self-propelled and unitary structure which is adapted by certain changes to different types of loading operations, such as loading from windrows of material or from stock piles or the like. The disclosed loader has a main chassis or frame 10 supported at the rear by driven wheels 12 and at the front by steerable wheels 13. A prime mover, such as an internal combustion engine, is mounted within a housing 14 at the rear of the main frame. As shown in Fig. 1, an operator's station 15 is provided at one side and near the front of the machine, from which position an operator may control the movements and operations of various parts and may observe the progress and operations of the machine as work progresses.

An A-frame 16 is secured to and extends upwardly from the rear portion of the main frame 10 and has side portions in opposed relationship on opposite sides of the main frame, each of which side portions includes a rear upright 17, a diagonal brace 18 and a horizontal brace 19. The rear uprights 17 and the diagonal braces 18 are secured together at their upper ends and each has its lower end secured to the main frame. The opposite ends of the horizontal brace 19 are secured to the mid-portions of the rear uprights and the diagonal braces to strengthen the side frame structure. This A-type frame structure provides an elevated rear support, relative to which the rear end of an elevating conveyor 20 is supported for swinging movement in a vertical plane. In the present instance, the elevating conveyor 20 is of the endless belt type having a longitudinally extending conveyor belt 22 carried between opposed side panels 23. The front end of the elevating conveyor 20 is supported for vertical movement relative to the main frame 10 through the adjustable lifting mechanism (not shown), which may be controlled from the operator's station. At the extreme forward end of the elevating conveyor, there is a material gathering and feeding mechanism which is designated generally by the reference numeral 25.

For the purpose of moving material onto the forward or material receiving end of the elevating conveyor 20, I have provided an endless chain and scraper type of feeding conveyor 26. This conveyor, in order to compensate for operating conditions including the amount of material being moved by the feeding conveyor, as well as to prevent damage thereto when rocks or large pieces of material are encountered, is supported for vertical swinging movement by side arms 27; the side arms being hingedly supported relative to the main frame 10 at their rear ends and extending forwardly to positions ahead of the elevating conveyor and such that the feeding conveyor projects well ahead of the forward end of the elevating conveyor. In the disclosed loader, the forward ends of the side arms 27 are supported for vertical movements relative to the forward end of the elevating conveyor by adjustable supporting elements 28.

Figures 2, 3:
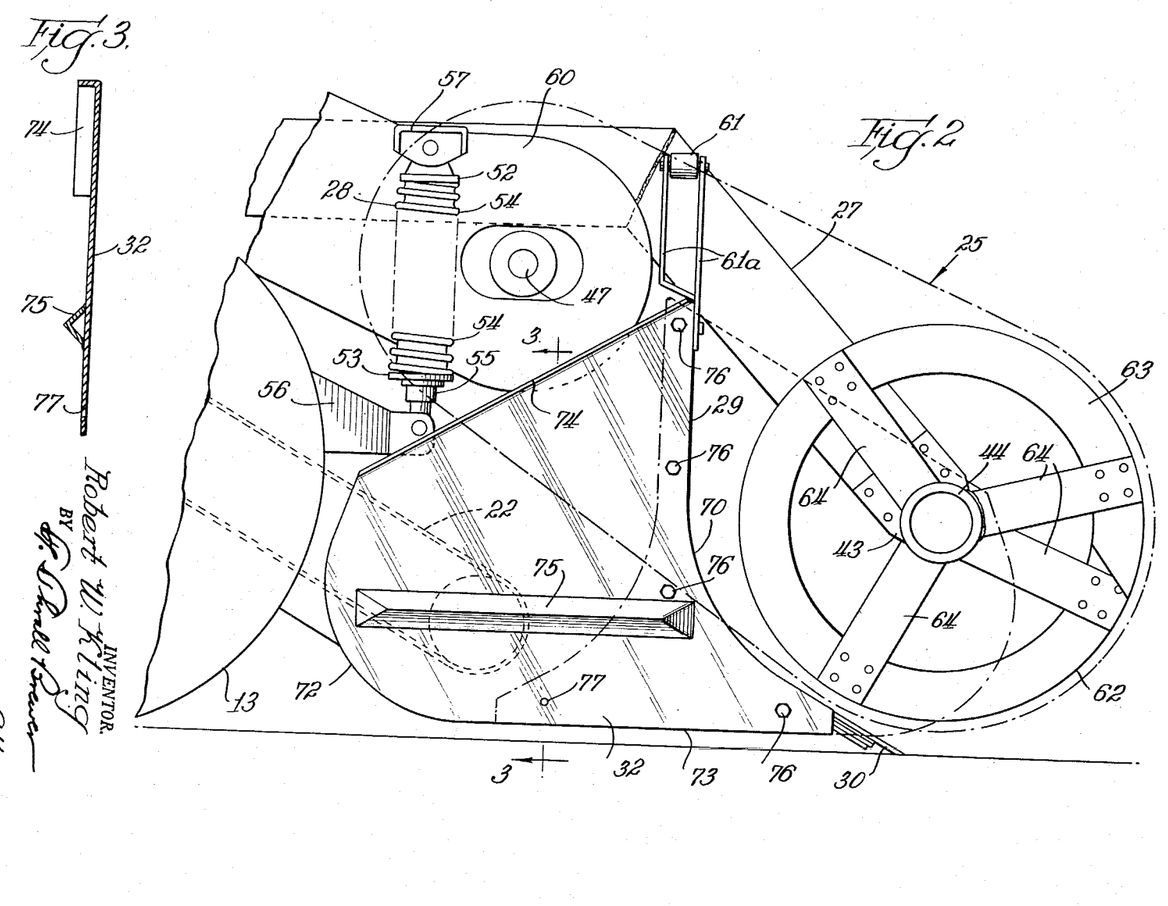
Fig. 2 is a fragmentary side elevational view of the front end portion of the loading machine shown in Fig. 1, and wherein certain parts are shown in different positions than those depicted in Fig. 1.
Fig. 3 is an end sectional view of a part of the structure shown in Fig. 2, and is taken substantially on a line 3—3 of Fig. 2, in the direction indicated by arrows.

In order to broaden the path from which material is gathered by the disclosed loader, a plate 29 extends laterally of the forward end of the elevating conveyor and projects well beyond the opposite sides of that conveyor. The upper portion of the plate 29 is substantially straight and the lower portion thereof curves forwardly, the lower edge being adjoined by a blade 30 which provides a front cutting edge across which material is moved to the material gathering and feeding mechanism 25. At the opposite ends of the plate 29 and blade 30, end plates 32 are removably secured, so as to project angularly therefrom. The end plates 32, in my disclosed structure, are constructed and arranged so that they may be mounted to project forwardly, as shown in Fig. 1, or rearwardly as shown in Fig. 2. When mounted to project forwardly, the loader is adapted to operations such as loading from windrows, and the end plates 32 prevent material from being spilled around the ends of the plate 29. In operations such as loading from stock piles and the like, the end plates 32 are preferably mounted so as to extend rearwardly, in which instance they prevent material from the stock pile from flowing into positions ahead of the front wheels 13 of the loader, thereby to interfere with the ease of operation and movement of the loader.

In the loader depicted in Fig. 1, an auxiliary conveyor 33 is mounted on the rear of the loader to receive material from the upper or discharge end of the elevating conveyor belt 22. This auxiliary conveyor includes side frame parts such as 34, side panels 35, and braces 36, and is mounted at the rear of the loader between the rear uprights 17 so as to be swingable laterally of the loader to adjusted positions.

Figures 9, 10, 11, 12:
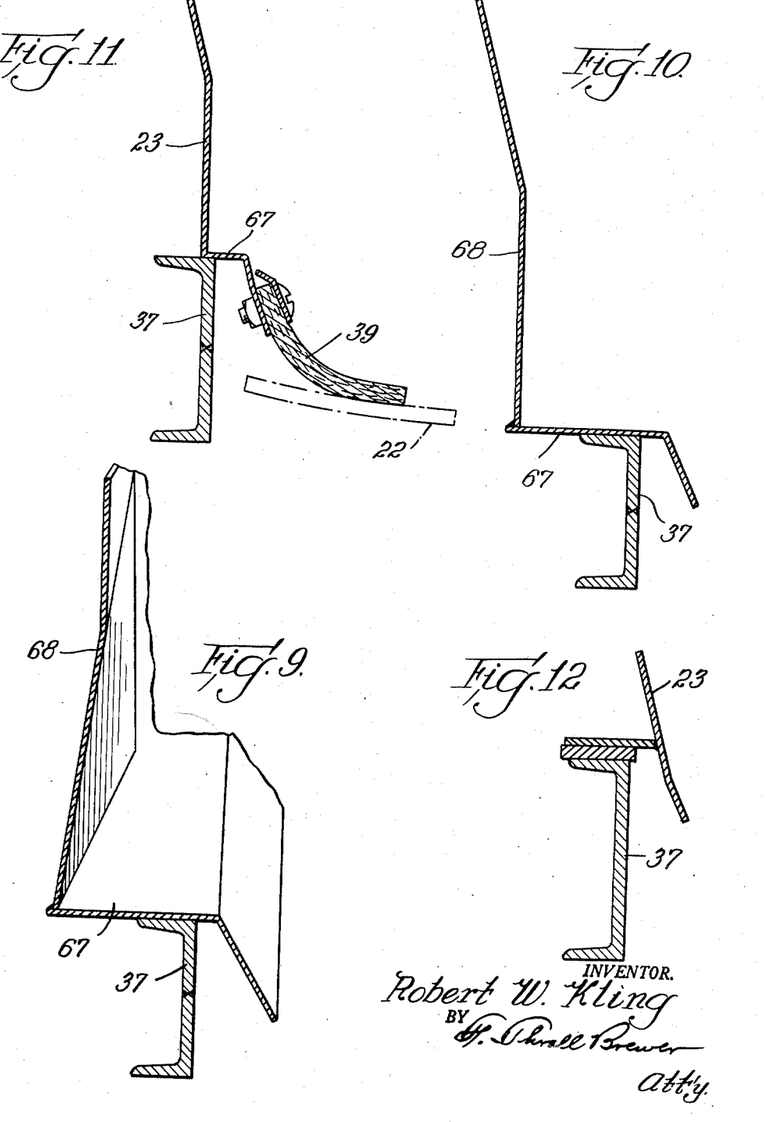
Fig. 9 is a fragmentary sectional view, taken substantially as indicated by lines 9—9 in Figs. 7 and 8, and in the direction of the accompanying arrows in those figures.
Figs. 10, 11 and 12 are fragmentary sectional views taken substantially as indicated by lines 10—10, 11—11, and 12—12, respectively, in Figs. 7 and 8.

Referring in greater detail to certain portions of the structure which have thus far been generally discussed, the elevating conveyor 20 includes opposed and substantially parallel side channels 37 between which the conveyor belt 22 is supported for longitudinal movement. Cleats, such as 38, may, when desired for the handling of many types of materials, be secured to the upper surface of the belt in longitudinal spaced relationship. Also, to prevent the escape of relatively small particles of material along the sides of the elevating conveyor, flexible webs 39 are secured to the lower portions of the side panels 23, is shown in Figs. 1 and 11, and overlap the side margins of the conveyor belt 22, so as to remain in contact therewith. The webs 39 may be made of a flexible and wear-resistant material, such as relatively heavy sheet rubber, and are outside of the ends of the cleats, as well as curved so as to contact directly with the conveyor belt surface.

In the disclosed loader structure, the operation of the elevating conveyor 20 is controllable from the operator's station and is driven from the prime mover through mechanism including a drive chain carried within housings 40 and 58 which extend along the diagonal brace 18 at one side of the loader, as shown in Fig. 1. With this structural arrangement, driving force is transmitted to the conveyor belt 22 through an intermediate shaft 42 which is carried at the apex of the A-frames. This shaft 42 also serves as a fulcrum about which the elevating conveyor is raised and lowered to determine the level at which the blade 30 operates relative to the ground.

Figure 4:
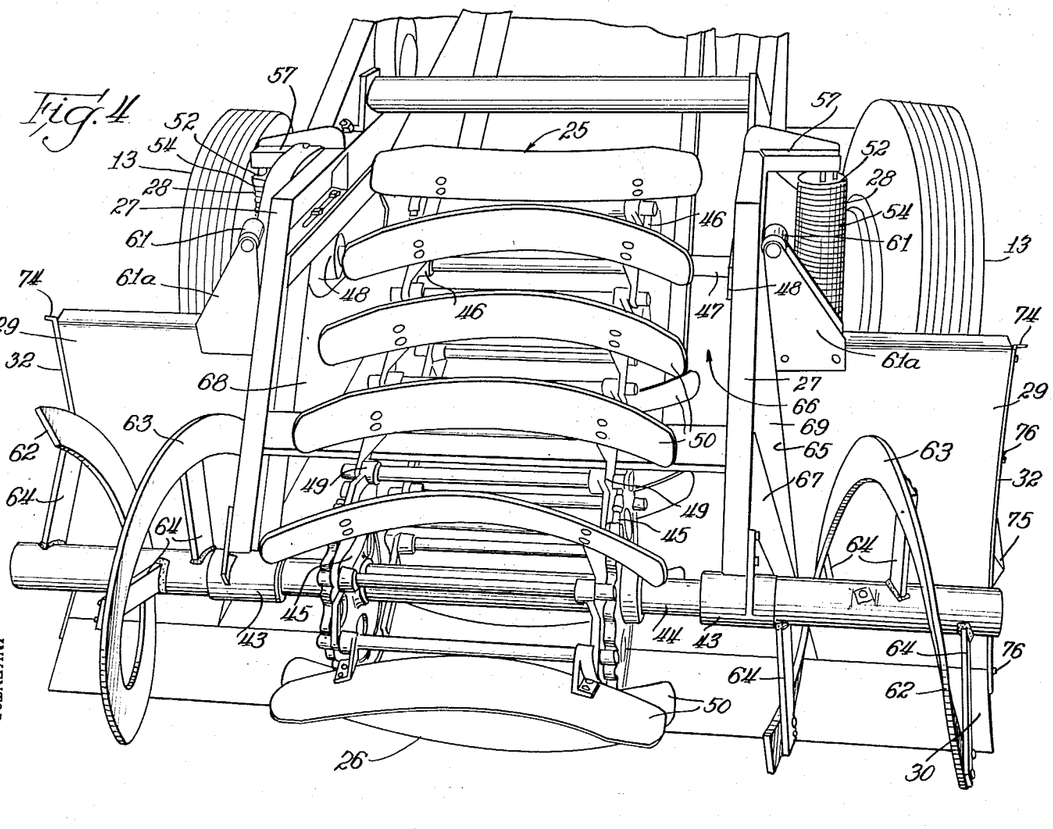
Fig. 4 is a fragmentary front perspective view of the loading machine illustrated in Figs. 1 and 2.
Figure 5:
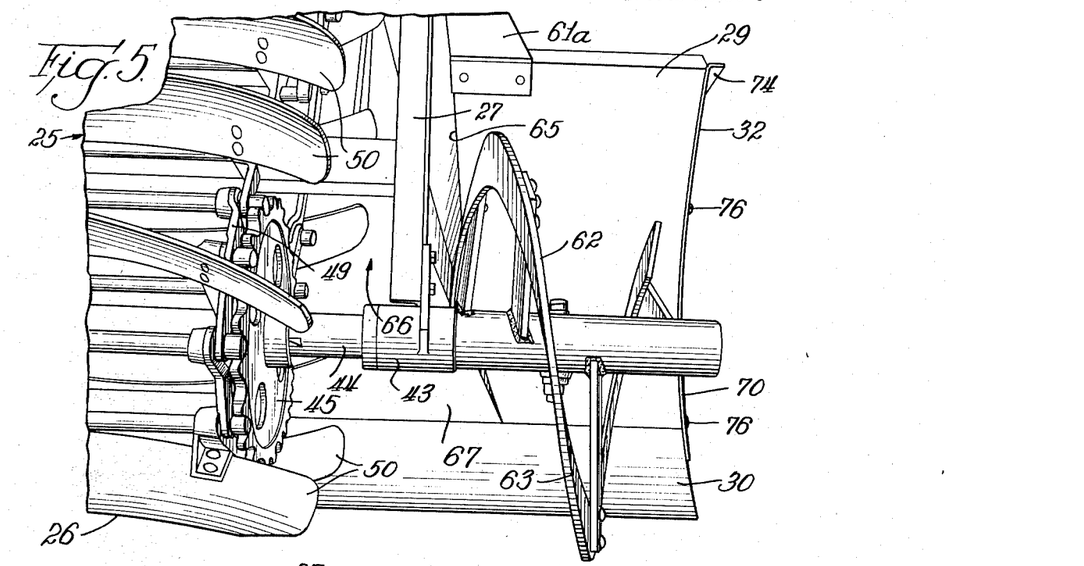
Fig. 5 is a fragmentary front perspective view taken from a somewhat different position than Fig. 4 and depicting a portion of the structure shown in Fig. 4.
Figure 6:
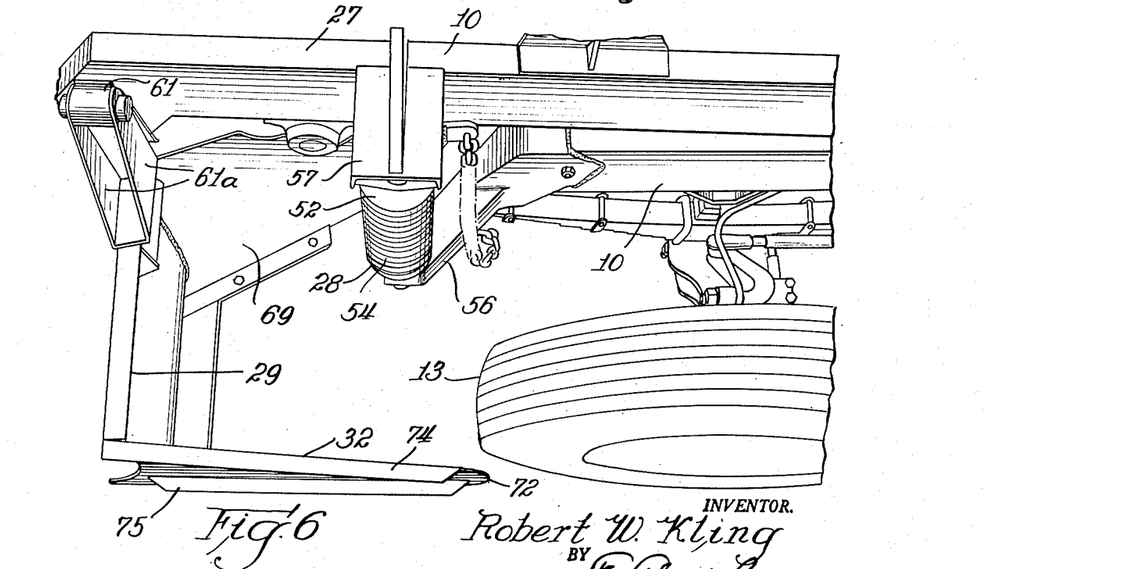
Fig. 6 is a fragmentary perspective view taken from above and to one side of the front end portion of my disclosed loading machine.

The side arms 27 which carry the feeding conveyor 26 are supported for vertical swinging movement relative to the main frame 10 at their rear ends. As shown in Figs. 1, 4 and 5, bearings 43 at the front ends of the side arms 27 rotatably support a cross shaft 44 which is preferably tubular in section and which not only extends between the side arms, but also projects a substantial distance on the outsides of the arms. Between the side arms 27, sprockets 45 are drivingly secured to the cross shaft 44; the sprockets 45 being separated a distance which is somewhat less than the width of the elevating conveyor and spaced inwardly of the side arms, as shown in Fig. 4. Additional sprockets 46 are mounted on, and drivingly connected to a feeding conveyor drive shaft 47, and are aligned with the sprockets 45. The shaft 47 is journaled in bearing blocks 48, which bearing blocks are mounted on the side arms 27 in aligned relationship and rearwardly of the arms 27 from the bearings 43. The aligned sprockets 45 and 46 carry endless conveyor chains 49, which conveyor chains have scraper blades 50 secured to their outer surfaces so as to project outwardly from the chains and extend across those chains in a direction generally parallel to the axis of the shafts 44 and 47. Preferably, the ends of the blades are curved, so that in their normal direction of movement, which is rearwardly on the lower sides of the sprockets, they tend to gather material inwardly while moving it to the rear from the blade 30 to the elevating conveyor belt 22.

Considered as a unit, the feeding conveyor is centered laterally of the loader with respect to the elevating conveyor 20. When the quantity of material which is being picked up by the loader is relatively small, and when the sizes of the pieces are generally small, it is desirable to operate the loader with the feeding conveyor blades moving in relatively close proximity to the blade 30. When the sizes of the pieces of material are larger or when the quantity of material is larger, improved operation is effected by having the feeding conveyor elevated to some extent above the level of the blade 30. In any instance, there is a possibility of occasionally encountering a rock or a large piece of material during normal loading operations. Furthermore, resilience in the support of the feeding conveyor is desirable in a propelled loader of the type disclosed, in order to limit shock forces on the loader structure which result from movements over rough terrain or the encountering of rocks or large pieces of material, as aforementioned. The desirable variations in the normal elevation of the feeding conveyor and the preferred resilience in the support thereof are provided in the disclosed loader by the adjustable supporting elements 28.

In my disclosed loader, the adjustable supporting elements 28 include telescopically engaging cylinders having flanges 52 and 53 at their opposite ends, which cylinders are fitted together for sliding movement relative to one another and have a compression spring 54 encompassing their outer surfaces and engaged at its opposite ends by the flanges 52 and 53. Thus, the cylinders and their respective flanges 52 and 53 are movable axially relative to one another, subject to the resilient action and control of the spring 54. To provide controllable extensibility for raising and lowering the feeding conveyor, the inner cylinder has a piston 55 mounted therein to form an hydraulically operated jack. At the lower end of each of the adjustable supporting elements 28, the piston 55 is supported by a bracket 56 from the main frame 10, while the upper end of the outer cylinder is connected to a bracket 57 which projects outwardly from each of the side arms 27. With this arrangement, the weight of the hingedly supported and vertically movable feeding conveyor is resiliently carried through the compression springs 54, which springs balance that weight in partially extended positions, and the elevation of the feeding conveyor relative to the blade 30 is determined by the hydraulic jacks, of which the pistons 55 form parts. Stops (not shown) are provided for limiting the downward movement of the arms 27, so that the blades 50 of the feeding conveyor are prevented from engaging the blade 30. Guide rollers 61 are carried between support plates 61a on opposite sides of the top of the plate 29, and engage the outer surfaces of the side arms 27 of the feeder conveyor during the vertical movement of those arms, thereby to provide lateral stabilization of the feeder conveyor without interfering with its vertical swinging movements.

The feeding conveyor 26, like the elevating conveyor 20, is driven from the prime mover through chains and sprockets enclosed within housings 59 and 60, as depicted in Fig. 1. The housings 59 and 60 extend along that side arm 27. One of the sprockets in the housing 60 is drivingly connected to the shaft 47, whereby the feeding conveyor is driven from that shaft and through its rear sprockets 46.

In addition to the feeding conveyor 26 which moves material directly across the blade 30 and toward the elevating conveyor 20, my disclosed loader includes screw or auger type conveyors 62 at opposite sides of the feeding conveyor for moving material inwardly along the blade 30 and plate 29 from the sides and toward the feeding conveyor 26. The screw or auger type side conveyors of my loader each include an edgewise wound metal strip 63 having an outer diameter corresponding closely to that of the arc defined by the outer edges of the scraper blades as they pass over the peripheries of the sprockets 45. In addition to concentrically encompassing the projecting end portions of the shaft 44, the turns of the strip 63 extend axially of those projecting shaft ends to form helices. Each helix is supported relative to the projecting end of the shaft by a series of radial spokes 64, which spokes are secured to the shaft and to the strip. Also, the axial displacement of the successive portions of each helical strip is so related to the normal direction of movement of the feeding conveyor 26 and shaft 44 that material is moved inwardly toward the feeding conveyor by those helices as the operation of the loader progresses. The effective action of the screw or auger type conveyors is improved by virtue of the fact that they are backed by the plate 29 and the blade 30. From the foregoing description, it may be readily understood that the side conveyors, as well as the feeding elevating conveyors are all driven from the prime mover to effect the gathering and movements of material during the operation of the loader.

As shown in the drawings, the plate 29 has an opening 65 at the mid-portion thereof which is adjoined by a channel 66 from and through which the feeding conveyor 26 extends to a position somewhat ahead of the forward or cutting edge of the blade 30. The channel is defined by a bottom plate 67 and side plates 68 and 69 which comprise spaced and opposed side walls of the channel. In order to improve the material gathering operation of the loader, and particularly to prevent larger pieces of material from getting caught or jammed in or between the side and feeding conveyors at the front end of the loader, certain relationships have been established between the side and feeding conveyors and between those conveyors, the plate 29 and the channel 66.

The feeding conveyor 26, as has been stated, is of practically the same width as the elevating conveyor 20. Also, as indicated in Fig. 2, the feeding conveyor overlaps the lower end of the elevating conveyor, so that the material is pushed by the feeding conveyor along the bottom 67 of the channel and onto the elevating conveyor. As one precaution for preventing large pieces of material from being forced into the side of the feeding conveyor in a manner that might cause damage, the side conveyors are spaced substantially from the opposite sides of the feeding conveyor. Furthermore, since the material is required to change its direction of movement in passing from the side conveyors to the feeding conveyor, the opening 65 in the plate 29 and the front end of the channel 66 are considerably wider than the feeding conveyor, thereby providing one precaution for preventing large pieces of material from being caught at the corners defined by the juncture of the channel with the plate 29.

As an additional precaution for preventing material from being caught at those corners, the side conveyors are of a length and are so disposed that they extend across the corners, so that pieces of material are moved inwardly beyond the corner before the forced change in direction is effected by the passing of the material from the influence of the side conveyors to the feeding conveyor.

Figures 7, 8:
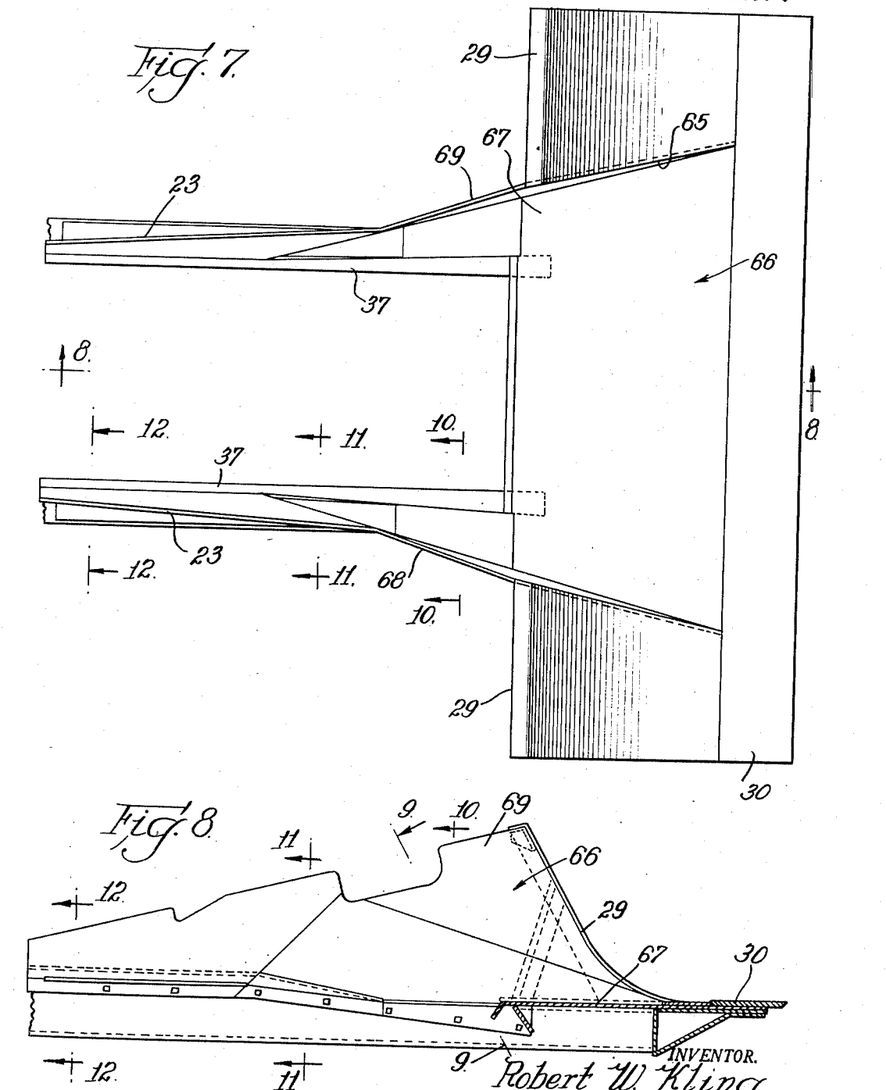
Fig. 7 is a fragmentary top plan view illustrating the structure and details of certain portions of the front end portion of my disclosed loading machine.
Fig. 8 is a fragmentary side sectional view, taken substantially on a line 8—8 of Fig. 7 and in the direction indicated by arrows.

As depicted by Figs. 4, 5 and 7 of the drawings, the side walls of the channel 66 converge from the opening 65 in the plate and along the sides of the feeding conveyor 26 toward the elevating conveyor. This convergence tends gradually to force the material inwardly to the side limits of the elevating conveyor. In my disclosed structure, the side walls of the channel 66, in addition to converging laterally toward the feeding conveyor, also converge upwardly. This upward convergence effects an inward rolling movement of the material being loaded as it is pushed rearwardly along those side walls toward the elevating conveyor by the feeding conveyor and by the forward progress of the loader. The planes of various portions of the side plates 68 and 69 which constitute the side walls of the channel are depicted in Figs. 7 to 11 inclusive.

In loading operations, such as the gathering of material from windrows, the end plates 32 are mounted on the opposite sides of the plate 29, so that they project forwardly across the outer ends of the side conveyors, as shown in Fig. 1. In other operations, such as loading material from stockpiles, the end plates 32 are mounted so as to extend rearwardly from the plate 29, as shown in Fig. 2. In the first mentioned position, the end plates prevent material from being pushed sidewise around the opposite ends of the plate 29, while in the second mentioned position, they extend to a position adjacent the front of the loader steering wheels and prevent material from flowing in at the ends of the plate 29 to positions ahead of the loader steering wheels.

In the disclosed loader, each of the plates 32 has a concavely curved edge 70 at one end which substantially conforms to the curvature of the plate 29. At the opposite end, each plate has a convexly curved end edge 72. A bottom edge 73 of each plate is substantially straight and normally assumes a position in substantially parallel relationship to the ground surface. At the top, an integrally formed flange 74 is provided to stiffen the end plate structure. Along the mid-portion of each end plate, a formed sheet metal rib 75 is secured to one surface, as by welding, to afford additional stiffness.

The end plates 32, when mounted in either position, are removably secured in place by fastening means, such as cap screws 76 threaded into a suitable flange on the rear edge of the plate 29. In Figs. 1 and 2, it may be observed that holes 77 and 78 at spaced positions near the bottom of each end plate are provided for the mounting of those end plates in their aforementioned reversed positions. It may be readily understood that with the disclosed structural arrangement, the end plates are switched from side to side of the loader front end structure and are reversed in position to effect their reversed mounting.

From the foregoing description and reference to the accompanying drawings, it may be readily understood that I have provided a power operated conveyor-type loading machine which embodies structural features and arrangements of parts in the material gathering and feeding portion of the loader which not only serve to adapt the loader to effective operation for different types of use, but which also provide for effective and efficient feeding of the gathered material onto the elevating conveyor with a minimum possibility of having larger pieces of material jammed in the feeding conveyors or between those conveyors and the material gathering plate.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A power operated conveyor-type loading machine comprising an elevating conveyor, a material gathering and guide plate extending laterally of the material receiving end of the elevating conveyor and having an opening in the mid-portion thereof aligned with and materially wider than the elevating conveyor for the passage of material to the elevating conveyor, a feeding conveyor extending through said opening in the plate from a position over the material receiving end of the elevating conveyor to a position ahead of the plate for moving material through the opening and onto the elevating conveyor, rotary pusher type conveyors on opposite sides of the forward end of the feeding conveyor for moving material along opposite ends of the plate toward the feeding conveyor, said elevating conveyor and the feeding conveyor being substantially narrower than said opening, said rotary pusher type conveyors being spaced from the opposite sides of the front end of the feeding conveyor and each having a length such that it moves material across the adjacent side of the opening, and opposed side walls adjoined to and extending rearwardly from the plate at opposite sides of the opening and converging toward the elevating conveyor at opposite sides of the feeding conveyor.

2. A power operated conveyor-type loading machine as defined in claim 1, and wherein said side walls are disposed at angles relative to the vertical so that they have portions converging upwardly at opposite sides of the feeding conveyor to effect inward rolling movement of the material as it is moved along by the feeding conveyor.

3. A power operated conveyor-type loading machine as defined in claim 1, and further characterized by end plates secured to opposite sides of the curved plate and extending forwardly therefrom across opposite outer end portions of the rotary pusher type conveyors.

4. A power operated conveyor-type loading machine comprising an elevating conveyor, a material gathering plate extending laterally across the material receiving end of the elevating conveyor and adjoined at its lower edge by a cutting blade, said plate having an opening in the mid-portion thereof aligned with and materially wider than the elevating conveyor for the passage of material to the elevating conveyor, said plate also having end portions on opposite sides of the opening which extend forwardly near the bottom and which are relatively flat and extend upwardly at the rear of the forwardly extending portions, a channel defined by opposed side walls and a bottom, said channel adjoining the material gathering plate at said opening and extending rearwardly therefrom to provide a passage for the flow of material to the elevating conveyor, said opening and the portion of the channel adjacent thereto being wider than the elevating conveyor, and the side walls of the channel converging away from the plate to approximately the width of the elevating conveyor, a feeding conveyor extending forwardly through the channel from a position ahead of the blade to a position overlapping the elevating conveyor for moving material through the channel to the elevating conveyor, said feeding conveyor being narrower than the opening and forward end of the channel, and power operated side conveyors for moving material inwardly along opposite sides of the plate toward the feeding conveyor, the length and position of each of the side conveyors being such that it extends across the adjacent side wall of the channel.

5. A power operated conveyor-type loading machine as defined in claim 4, and wherein said side walls converge upwardly so as to effect an inward rolling movement of material as such material is moved through the channel toward the elevating conveyor by the feeding conveyor.

6. In a power operated conveyor-type loading machine, the combination comprising an elevating conveyor, a material gathering plate extending laterally across the material receiving end of the elevating conveyor and adjoined at its lower edge by a cutting blade, said plate having an opening in the mid-portion thereof aligned with the elevating conveyor for the passage of material to the elevating conveyor, said plate also having end portions on opposite sides of the opening which extend forwardly near the bottom and which are relatively straight above the forwardly extending portions, a channel defined by opposed side walls and a bottom, said channel adjoining the material gathering plate at said opening and extending rearwardly therefrom to provide a passage for the flow of material to the elevating conveyor, said opening and the portion of the channel adjacent thereto being materially wider than the elevating conveyor to provide space for the movement of relatively large pieces of material around the corners formed by the plate and channel side walls, and the side walls of the channel converging away from the plate to approximately the width of the elevating conveyor gradually to confine the spread of the flowing material in the channel.

7. In a power operated conveyor-type loading machine as defined in claim 6, the combination being further characterized by a feeding conveyor extending longitudinally in said channel for moving material through the channel to the elevating conveyor, and said feeding conveyor being substantially narrower than said opening.

8. In a power operated conveyor-type loading machine as defined in claim 6, the combination being further characterized by side conveyors for moving material inwardly along opposite sides of the plate to said opening, and the lengths and positions of the side conveyors being such that they extend along an end portion of the plate and across the edge of said opening.

9. In a power operated conveyor-type loading machine as defined in claim 6, said opposed side walls of the channel converging upwardly so as to effect an inward rolling movement of material adjacent the side walls as such material moves through the channel toward the elevating conveyor.

10. In a power operated conveyor-type loading machine, the combination comprising a material gathering plate having a cutting edge at the bottom thereof, said plate having an opening in the mid-portion thereof and above the cutting edge for the passage of gathered material, said plate also having end portions on opposite sides of the opening which extend forwardly toward the cutting edge near the bottom and are relatively straigtht above the forwardly extending portions, and end plates removably secured to the outer ends of the material gathering plate so as to project in substantially right angular relationship thereto, and said end plates having sets of bores near one end thereof through which they may be bolted to the material gathering plate, whereby they are reversible relative to the material gathering plate so as to change the direction of their projection from the material gathering plate.

11. In a power operated conveyor-type loading machine, the combination comprising an elevating conveyor having a material receiving end, a feeding conveyor overlapping the elevating conveyor and of approximately the same width as the elevating conveyor, and means defining a channel having walls extending along opposite sides of the feeding conveyor, said walls converging toward the elevating conveyor from a channel width materially greater than the width of the feeding conveyor, and said walls converging upwardly throughout substantial portions of their lengths to effect inward rolling movement of material moved therealong by the feeding conveyor.

12. In a power operated conveyor-type loading machine, the combination comprising an endless belt type of elevating conveyor having material receiving and discharge ends at the front and rear respectively, side and bottom walls forming a channel aligned with the material receiving end of the elevating conveyor and extending forwardly therefrom, the bottom of said channel being in overlapping relationship to the material receiving end of the elevating conveyor, said elevating conveyor having side walls which merge with the side walls of the channel, a material gathering plate extending laterally across the front end of the channel and adjoined at its lower edge by a forwardly projecting cutting blade, said plate having an opening at the mid-portion thereof which is aligned with the channel, and the bottom of the channel adjoining the cutting blade, a power operated feeding conveyor extending through said channel from a position over the material receiving end of the elevating conveyor to a position ahead of the cutting blade, power operated pitched rotary type conveyors at opposite sides of the front end of the feeding conveyor for moving material inwardly along opposite ends of the plate to the said opening for movement through said channel by the feeding conveyor, the inner ends of said pitched rotary type conveyors extending across opposite side edges of said opening and being spaced from the opposite sides of the feeding conveyor, and the side walls of said channel driverging at the front of the channel to provide relief for the passage of gathered material around the corners at the juncture of the plate and the side walls of the channel.

13. In a power operated conveyor-type loading machine, the combination comprising a material gathering plate having front and rear faces and a relatively straight cutting edge extending across the bottom thereof, said plate having an opening at the mid-portion thereof which extends through the plate above the cuting edge, wall and bottom plates adjoining the first mentioned plate at said opening and extending angularly from the rear face thereof to provide a channel for the flow of material gathered by the plate and cutting edge, pitched rotary type conveyors mounted for rotational movement at opposite sides of the front face of the first mentioned plate and extending across opposite side edge portions of the opening for moving material inwardly to the opening from opposite sides of the front face of the first mentioned plate, and a feeding conveyor extending through said channel from a position between the pitched rotary type conveyors for moving material through the channel from the inner ends of the pitched rotary type conveyors and in a direction transverse to that of the material movements produced by the pitched rotary type conveyors, the inner ends of said pitched rotary type conveyors and said feeding conveyor having spaces therebetween which are inside of the limits defined by the maximum width of said opening, so as to provide relief for the change of direction of said material.

ROBERT W. KLING.

References Cited in the file of this patent

UNITED STATES PATENTS

| Number | Name | Date |
|---|---|---|
| 1,630,598 | Barber | May 31, 1927 |
| 1,764,084 | Nelson et al. | June 17, 1930 |
| 1,862,230 | McDermott | June 7, 1932 |
| 2,199,257 | Ferrin | Apr. 30, 1940 |
| 2,208,128 | Holbrook et al. | July 16, 1940 |
| 2,315,091 | Fees | Mar. 30, 1943 |
| 2,623,624 | Slocum | Dec. 30, 1952 |
| 2,639,022 | MacDonald | May 19, 1953 |